US007994467B2

(12) United States Patent
Fushman et al.

(10) Patent No.: US 7,994,467 B2
(45) Date of Patent: Aug. 9, 2011

(54) OPTICAL CAVITY EMITTER ARRANGEMENTS WITH SPECTRAL ALIGNMENT AND METHODS THEREFOR

(75) Inventors: Ilya Fushman, Palo Alto, CA (US); Andrei Faraon, Palo Alto, CA (US); Jelena Vuckovic, Palo Alto, CA (US); Dirk Englund, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 442 days.

(21) Appl. No.: 12/134,414

(22) Filed: Jun. 6, 2008

(65) Prior Publication Data

US 2009/0045317 A1    Feb. 19, 2009

Related U.S. Application Data

(60) Provisional application No. 60/942,365, filed on Jun. 6, 2007.

(51) Int. Cl.
*G01J 1/20* (2006.01)
*G02B 6/26* (2006.01)
(52) U.S. Cl. ........ 250/216; 250/201.1; 385/27; 385/129
(58) Field of Classification Search .................. 250/216, 250/552, 553, 201.1; 359/322, 324; 385/129–131, 385/27, 30; 438/22
See application file for complete search history.

(56) References Cited

U.S. PATENT DOCUMENTS 6,468,823 B1   10/2002  Scherer et al.
2008/0224121 A1*   9/2008  Bose et al. .................. 257/13

OTHER PUBLICATIONS

E. Yablonovitch, "*Photonic Crystals: Semiconductors of Light,*"Scientific American, Dec. 2001, pp. 47-55.
A. Faraon, D. Englund, I. Fushman, J. Vuckovic, N. Stoltz and P. Petroff, "*Local quantum dot tuning on photonic crystal chips,*"Applied Physics Letters, 90 (213110) 2007.
D. Englund, D. Fattal, E. Waks, G. Solomon, B. Zhang, T. Nakaoka, Y. Arakawa, Y. Yamamoto and J. Vuckovic, "*Controlling the Spontaneous Emission Rate of Single Quantum Dots in a Two-Dimensional Photonic Crystal,*"Physical Review Letters, 95 (013904), Jul. 2005.
T. Yoshie, A. Scherer, J. Hendrickson, G. Khitrova, H.M. Gibbs, G. Rupper, C. Ell, O.B. Shchekin and D.G. Deppe, "*Vacuum Rabi splitting with a single quantum dot in a photonic crystal nanocavity,*"Nature, vol. 432, pp. 200-203, Nov. 2004.
J.I. Cirac, P. Zoller, H.J. Kimble and H. Mabuchi, "*Quantum State Transfer and Entanglement Distribution among Distant Nodes in a Quantum Network,*"Physical Review Letters, vol. 78, No. 16, pp. 3221-3224, Apr. 1997.

(Continued)

Primary Examiner — Kevin Pyo
(74) Attorney, Agent, or Firm — Crawford Maunu PLLC (57) ABSTRACT

Aspects of the disclosure are directed to optical microcavities and emitters that are spectrally aligned in an arrangement having an array of such microcavity-emitter combinations. The spectral alignment can be selective, in that a portion of the array of microcavity-emitter combinations, or a single microcavity-emitter combination, can be individually spectrally aligned. In specific examples, light is coupled within a semiconductor device having wavelength-dependent structures and optical cavities optically couple to the wavelength-dependent structures. One of the optical cavities and a wavelength-dependent structure are spectrally aligned, independent of another of the optical cavities.

31 Claims, 8 Drawing Sheets

OTHER PUBLICATIONS

D. Englund, A. Faraon, B. Zhang, Y. Yamamoto and J. Vuckovic, "*Generation and Transfer of Single Photons on a Photonic Crystal Chip*,"Optics Express, vol. 15, No. 9, pp. 5550-5558, Apr. 2007.

K. Hennessy, A. Badolato, M. Winger, D. Gerace, M. Atature, S. Guide, S. Falt, E.L. Hu, and A. Imamoglu, "*Quantum nature of a strongly-coupled single quantum dot-cavity system*,"Nature, 445:896-899, Feb. 2007.

A.Hogele, S. Seidl, M. Kroner, K. Karrai, R.J. Warburton, B.D. Gerardot and P.M. Petroff, "*Voltage-Controlled Optics of a Quantum Dot*,"Physical Review Letters, vol. 93, No. 21 (217401) Nov. 2004.

D. Haft, C. Schulhauser, A.O. Govorov, R.J. Warburton, K. Karrai, J.M. Garcia, W. Schoenfled and P.M. Petroff, "*Magneto-optical properties of ring-shaped self-assembled InGaAs quantum dots*,"Physica E, 13:165-169, 2002.

A.Kiraz, P. Michler, C. Becher, B. Gayral, A. Imamoglu, L. Zhang, E. Hu, W.V. Schoenfeld and P.M. Petroff, "*Cavity-quantum electrodynamics using a single InAs quantum dot in a microdisk structure*,"Applied Physics Letters, vol. 78, No. 25, pp. 3932-3934, Jun. 2001.

W. Fon, K.C. Schwab, J.M. Warlock and M.L. Roukes, "*Phonon scattering mechanisms in suspended nanostructures from 4 to 40 K*," Physical Review B, 66 (045302) 2002.

K. Hennessy, A. Badolato, A. Tamboli, P.M. Petroff, E. Hu, M. Atature, J. Dreiser and A. Imamoglu, "*Tuning photonic crystal nanocavity modes by wet chemical digital etching*,"Applied Physics Letters, 87 (021108), 2005.

S. Strauf, M.T. Rakher, I. Carmeli, K. Hennessy, C. Meier, A. Badolato, M.J.A. DeDood, P.M. Petroff, E.L. Hu, E.G. Gwinn and D. Bouwmeester, "*Frequency control of photonic crystal membrane resonators by monolayer deposition*,"Applied Physics Letters, 88 (043116), 2006.

A. Rastelli, A. Ulhaq, S. Kiravittaya, L. Wang, A. Zrenner and O.G. Schmidt, "*In situ laser microprocessing of single self-assembled quantum dots and optical microcavities*,"Applied Physics Letters, 90 (073120), 2007.

C.D. Thurmond, "*The standard thermodynamic functions for the formation of electrons and holes in Ge, Si, GaAs and GaP*,"J. Electrochem. Soc., 122 (1133), 1975.

S. Seidl, M. Kroner, A. Hogele, K. Karrai, R.J. Warburton, A. Badolato and P.M. Petroff, "*Effect of uniaxial stress on excitons in a self-assembled quantum dot*,"Applied Physics Letters, 88 (203113), 2006.

A.Badolato, K. Hennessy, M. Atature, J. Dreiser, E. Hu, P.M. Petroff and A. Imamoglu, "*Deterministic Coupling of Single Quantum Dots to Single Nanocavity Modes*,"Science, 308(5725), pp. 1158-1161, May 2005.

\* cited by examiner

OPTICAL CAVITY EMITTER ARRANGEMENTS WITH SPECTRAL ALIGNMENT AND METHODS THEREFOR

RELATED PATENT DOCUMENTS

This is a conversion of U.S. Provisional Patent Application Ser. No. 60/942,365, entitled "Optical Cavity Emitter Arrangements with Spectral Alignment and Methods Therefor," and filed on Jun. 6, 2007, to which priority is claimed under 35 U.S.C. §119.

FEDERALLY-SPONSORED RESEARCH OR DEVELOPMENT

This invention was made with Government support under contracts N00014-06-1-0595 awarded by the Department of the Navy ONR and DAAD19-03-1-0199 awarded by the Department of the Army. The Government has certain rights in this invention.

FIELD OF THE INVENTION

The present invention relates generally to optical cavity emitter arrangements and methods, and more particularly, to optical cavity arrangements and methods involving spectrally-aligned quantum dots and spectrally aligned cavities.

BACKGROUND

Optical cavities are used for controlling, confining or otherwise passing light for a variety of arrangements and applications. These applications include lasers, quantum information networks, optical memory devices, integrated optical circuits for optical communications and interconnects, emitters, and resonators. Optical cavities, and in particular optical microcavities, have a relatively thin layer in which light is confined, sometimes referred to as a spacer layer, with reflective material on faces of the thin layer to confine the light. These microcavity layers have dimensions on the scale of several hundred micrometers or less (thus the term "micro" in "microcavities"). In some applications, the microcavity layers are less than about one micrometer across, and as such are sometimes referred to as nanocavities.

One type of microcavity that is used in many applications is the photonic crystal cavity. Photonic crystal cavities are particularly suited for controlling and confining light in scales on the order of a cubic wavelength of light in the material. Photonic crystal cavities employ a photonic crystal membrane material having a multitude of holes and exhibiting a photonic band gap, often referred to as a forbidden zone in which light of a particular wavelength range is blocked. Light entering the photonic crystal cavity refracts through and partially reflects at interfaces between the photonic crystal structure and air at each of the holes. Light is selectively passed through the crystal structure in accordance with the size and arrangement of holes (or lack of holes in certain locations), the light's wavelength, the light's direction of travel, and the refractive index of the crystal structure and surrounding material.

In this regard, by controlling the type of crystal structure and holes therein, photonic crystals can be used to affect the motion of light. When used with light emitters, photonic crystals facilitate desirable control over the radiative properties of the emitters. High quality factor (Q) cavities defined in photonic crystals confine photons to a small volume, thus increasing the light-matter interaction, which can be useful in fields including quantum electrodynamics, optical detection, and light sources.

One microcavity application that has been the subject of increasing interest in recent times involves solid-state approaches to quantum information processing. Cavity quantum electrodynamics (CQED) is used to manipulate quantum bits (qubits) and, in some applications, involves the use of quantum dots coupled to optical cavities to facilitate qubit manipulation. Photonic crystal cavities are particularly attractive for such applications due to their small mode volume and high quality factor, and their amenability in integration of on-chip networks for information processing.

While photonic crystals have been useful in facilitating quantum information processing, many challenges have remained. For instance, spatially and spectrally matching emitters to photonic crystal cavities has been inconsistent and difficult. In applications involving quantum dots such as InGaAs quantum dots, spectral alignment has been particularly difficult.

These and other characteristics have presented challenges to the implementation of microcavity arrangements such as photonic crystal cavity arrangements and others, for applications such as quantum information processing.

SUMMARY

The present invention is directed to approaches, devices and applications that overcome challenges including those mentioned above, and as related to applications discussed above and others. These and other aspects of the present invention are exemplified in a number of illustrated implementations and applications, some of which are shown in the figures, discussed below and/or characterized in the following claims.

According to an example embodiment of the present invention, optical microcavities and emitters are spectrally aligned in an arrangement having an array of such microcavity-emitter combinations. The spectral alignment is selective, in that a portion of the array of microcavity-emitter combinations, or a single microcavity-emitter combination, can be individually spectrally aligned. The alignment is generally reversible, and in some applications, is used to selectively tune (and de-tune) a sub-group of the microcavity-emitter combinations, or individual microcavity-emitter combinations, for operation of the array.

According to another example embodiment of the present invention, light is coupled within a semiconductor device having wavelength-dependent structures and optical cavities for optically coupling to the wavelength-dependent structures. One of the optical cavities and a wavelength-dependent structure are spectrally aligned, independent of another of the optical cavities.

In connection with another example embodiment of the present invention, an optical semiconductor device includes wavelength-dependent structures, optical semiconductor cavities and a spectral alignment arrangement. The spectral alignment arrangement spectrally aligns one of the optical cavities and a wavelength-dependent structure independent of another of the optical cavities, for optically coupling the wavelength-dependent structures.

According to another example embodiment of the present invention, an optical quantum information processing arrangement includes reconfigurable integrated optical circuits. The arrangement includes a plurality of optical circuits, with each circuit including an emitter and an optical cavity that selectively passes light as a function of the wavelength of the light. A spectral alignment arrangement aligns individual components of the optical circuits, independently from the spectral alignment of other ones of the optical circuits. For each of the optical circuits, the spectral alignment temporarily shifts at least one of the wavelengths at which the cavity passes light, and the wavelength at which the emitter emits light. A detector detects light from the temporarily spectrally-aligned optical circuits and outputs a signal characterizing the detected light to facilitate quantum information processing.

The above overview is not intended to describe each illustrated embodiment or every implementation of the present invention.

BRIEF DESCRIPTION OF THE DRAWINGS

The invention may be more completely understood in consideration of the following detailed description of various embodiments of the invention in connection with the accompanying drawings, in which:

FIG. 3 shows plots for approaches to emitter tuning in connection with various example embodiments, in which

FIGS. 4A-4B show plots characterizing the tuning of a photonic crystal cavity in connection with various example embodiments, in which

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention, including that described in the claims.

DETAILED DESCRIPTION

The present invention is believed to be applicable to a variety of microcavity arrangements and approaches for implementing the same. While the present invention is not necessarily limited to such applications, an appreciation of various aspects of the invention is best gained through a discussion of examples in such an environment.

According to an example embodiment of the present invention, optical cavities in an optical semiconductor device are independently spectrally aligned with wavelength-dependent structures. Heat, strain, optical, electrical or other stimulus is used to facilitate the spectral alignment. The spectral alignment is further reversible as implemented in connection with various embodiments.

According to another example embodiment of the present invention, one or more microcavity-emitter regions of an optical semiconductor device are selectively tuned for passing light. Each microcavity-emitter region includes an optical microcavity and an emitter that operate at respective wavelengths or in a particular range of wavelengths. That is, the microcavity operates at a resonant wavelength (or range of wavelengths) over which light is passed, and the emitter emits light at its own respective wavelength. One or both of the microcavity and emitter is tuned (e.g., shifted in operating wavelength) such that the respective operating wavelengths are spectrally aligned and light is coupled between the microcavity and emitter. With these approaches, individual microcavity-emitter regions, or groups of such regions, are selectively tuned to operate, relative to other microcavity-emitter regions in the device. In addition, the tuning is generally reversible, such that removal of the tuning mechanism (e.g., termination of the application of heat) from a particular microcavity-emitter region results in termination of the spectral alignment.

According to another example embodiment of the present invention, quantum dot or nanocrystal emitters are controlled to facilitate the selective operation of an optical microcavity arrangement. The emitters are arranged in optical structures having high quality-factor (high-Q) optical cavities and are independently controlled. In some applications, an in-situ approach involves the spectral tuning of InGaAs quantum dot operation (e.g., by up to about 1.8 nm in wavelength-based operation) and tuning of cavities (e.g., of up to about 0.4 nm, or 4 cavity line-widths). Using these approaches, distinct quantum dots are spectrally aligned with a variety of optical microcavities such as on a photonic crystal chip, facilitating on-chip quantum information processing and other applications.

In the above and other example embodiments described herein, and as may further be used in the claims, the term wavelength-dependent generally refers to device or structure characteristics that relate to the wavelength of light involved in the operation of the device or structure. In some applications, the term wavelength-dependent specifically refers to a wavelength of light that is emitted in response to a stimulus, such as the wavelength of a quantum dot emission or laser emission (e.g., the emission wavelength is dependent upon a condition such as temperature or strain). In other applications, the term wavelength-dependent relates to wavelengths that are selectively passed by an optical cavity, which may be related to a characteristic of the optical cavity (e.g., crystal type and photonic band gap) and/or the environment (e.g., temperature or strain); that is, the optical cavity passes light in a manner that is dependent upon the wavelength of the light. In still other applications, the term wavelength-dependent specifically refers to characteristics that are exhibited in response to a particular wavelength of light used as a stimulus (e.g., the operation of a device is dependent upon the wavelength of light incident upon the device).

A variety of optical cavity materials such as photonic crystals may be used as the optical microcavities described in various example embodiments herein. In one embodiment, a photonic crystal membrane is formed with a multitude of optical cavities therein, with wavelength-dependent structures that are responsive to laser induced heat, such as emitters arranged at the cavities or as part of the cavities. The photonic crystal membrane is locally heated to tune the properties of one or more of the wavelength-dependent structures interacting with the membrane. In some applications, this tuning is achieved by straining the structure or flowing an electrical current through it as an alternative to and/or in addition to the application of heat.

Wavelength-dependent structures that are tuned may include, for example, photonic crystal cavities, other microcrystal cavities, quantum dot emitters and nanocrystal emitters. This approach can be used for tuning objects related to the photonic crystal membrane that have temperature dependent properties.

In other embodiments, optical cavities are tuned to measure effects that change the frequency of the resonance of the optical cavities. One such embodiment involves changing the refractive index of either the cavity or its surroundings in an optical semiconductor device. An oscillatory heating signal is sent to the cavity while a laser beam tuned at the cavity resonance is reflected from the cavity. Refractive index changes in the vicinity of the cavity induce a change in the amplitude of the reflected signal. Certain applications are also directed to the detection of a change in frequency in the resonance of a spectrally-aligned optical cavity (or in connection with the aforesaid amplitude change). In some applications, the reflected signal is locked into the oscillation frequency of the heating signal to facilitate enhanced sensitivity.

Other example embodiments are directed to the spectroscopy of photon emitters coupled to optical cavities such as photonic crystal cavities, using a cavity-emitter tuning technique as described herein. With these embodiments, the photon emitters such as quantum dots or atoms exhibit variation in the wavelength of their photon emissions as a function of temperature (thus are wavelength-dependent, relative to temperature). A laser beam tuned into resonance with an optical cavity is reflected from the cavity while an oscillatory heating signal is applied to an emitter at the cavity. The interaction between the emitter and the cavity field is used to influence the reflected laser signal when the emitter is on resonance with the laser. The emission wavelength of the emitter is tuned using the heating laser, and emissions from the cavity-emitter system are detected and used to characterize the spectroscopic properties of the emitter. In some implementations, the detected light is locked into the oscillatory heating signal in a manner similar to that described above, to facilitate the characterization of the emitter.

According to another example embodiment of the present invention, cavity-emitter regions of an optical microchip device are independently tuned on-chip via distinct temperature control. The device includes a plurality of optical cavities in a substrate such as a GaAs substrate. Each cavity-emitter region has an optical cavity and a corresponding emitter such as a quantum dot, with one, two or more cavity-emitter regions controlled at different temperatures. The chip includes local thermal insulation to insulate cavity-emitter regions from one another to facilitate local and independent heating.

Figure 1:
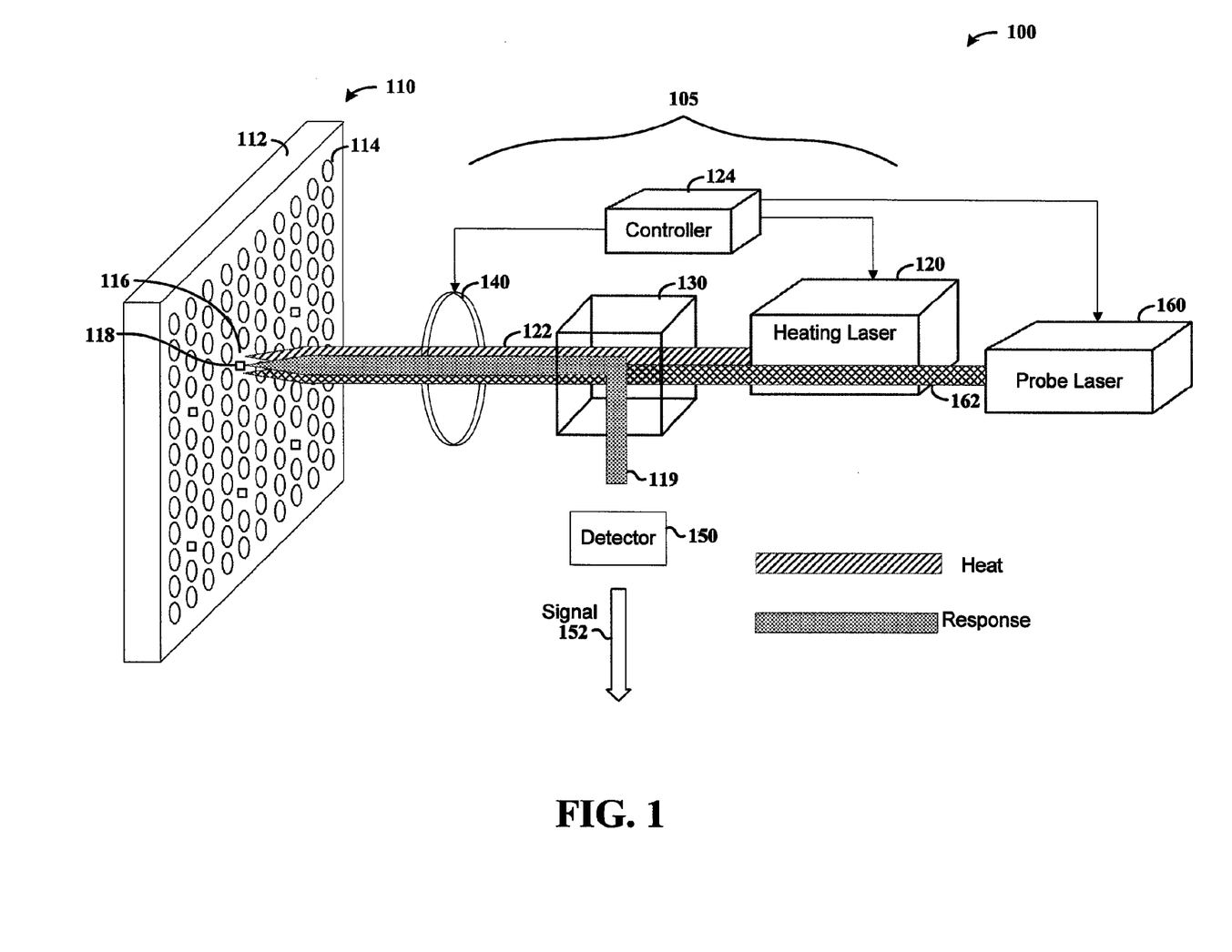
FIG. 1 shows an optical system that operates several optical cavities via selective spectral alignment, according to an example embodiment of the present invention.

Turning to the Figures, FIG. 1 shows an optical system 100 that operates several optical cavities via selective spectral alignment, according to another example embodiment of the present invention. The system 100 includes an optical stimulation/detection arrangement 105, and an optical cavity-emitter arrangement 110 that operates in response to stimulation. The stimulation arrangement 105 employs a heating laser 120 to selectively heat a portion of the optical cavity-emitter arrangement 110, by passing laser stimulation light 122 via a beam splitter 130 and a light director 140 that directs the light to a specific portion of the optical cavity arrangement. A controller 124 controls the application of the heating laser 120 and the light director 140.

The optical cavity-emitter arrangement 110 has a membrane 112 such as a photonic crystal membrane and one or more light confinement layers at surfaces of the membrane as part of the crystal or as a separate layer. The membrane 112 has an array of hole-regions including hole-region 114 labeled by way of example, which facilitate the confinement of light via a refractive index change, relative to the material of the membrane 112. In this regard, the hole-regions include air holes or holes having another gaseous material, or holes filled with another material that facilitates a desirable refractive index, relative to the membrane 112. Perturbations in the periodic array of holes define optical cavities including cavity 116 labeled by way of example. Each cavity selectively passes/confines light in the photonic band gap.

A wavelength-dependent structure is located at each optical cavity in the system 100, with wavelength-dependent structure 118 at optical cavity 116 labeled by way of example. The composition and placement of the wavelength-dependent structure 118 is selected for each application. For instance, some applications use an emitter such as a quantum dot or nanocrystal that exhibits an emission wavelength that varies as a function of temperature, such that heat applied by the heating arrangement 105 can be used to shift the emitter's emission wavelength. Other applications employ other wavelength-dependent devices, such as active structures (e.g., light sources) and passive structures (e.g., waveguides, filters or photonic circuit elements). In these and other embodiments, certain cavity regions employ two or more such wavelength-dependent devices.

To operate the system 100, the controller 124 sends inputs to operate the heating laser 120 to emit the stimulation laser light 122, which is passed through a beam splitter 130 towards the optical cavity-emitter arrangement 110. The controller 124 also sends inputs to control the light director 140 to direct the laser light to a target region of the optical cavity-emitter arrangement 110. By way of example, the stimulation laser light 122 is shown as being directed to the optical cavity 116 to apply heat to align the operational wavelength of the cavity with the emission wavelength of the emitter 118 (thus spectrally aligning the cavity and the emitter). In some applications, the alignment involves shifting the emission wavelength of the emitter, or the wavelength of light to which the emitter is responsive for emission. In other applications, the alignment involves shifting one or both of the wavelengths, or range of wavelengths, of light that is passed by the optical cavity 116 and the emission wavelength of the emitter or the wavelength of light to which the emitter is responsive for emission.

With this alignment, an emission 119 from the emitter 118 is readily coupled to the optical cavity 116 and passed from the cavity to the beam splitter 130, which directs the light to the detector 150. Moreover, optical band gap characteristics of the cavity 116 are used to mitigate the passage of other undesirable light, facilitating the ability of the detector 150 to detect the emission and produce a strong signal 152 regarding the same.

The above operational example is repeated for various optical cavities in the optical cavity-emitter arrangement 110, to selectively control the passage of light therefrom. For certain applications, the repetition involves concurrent heating, such as by selectively scanning the stimulation laser light 122 to different optical cavity regions. As the stimulation laser light 122 is directed away from a particular optical cavity region, the associated cavity and emitter cool, mitigating the alignment achieved via the heating. With these approaches, individual cavity-emitter combinations are selectively operated via the application of heat (e.g., turned on and off, relative to the optical coupling of the cavity and wavelength-dependent device). In this regard, the system 100 (and variations thereof) is applicable for use with a multitude of optical applications, such as those involving biological detectors, lasers, quantum information networks, optical memory devices, emitters and resonators. Furthermore, the system 100 is readily implemented in the design and testing of such devices, using the selective stimulation of optical cavities and related response detection to characterize the operation of optical semiconductor designs.

In some example embodiments, the optical system 100 includes a probe laser 160 that directs probe light 162 to stimulate a response from the cavity-emitter arrangement 110. The probe laser 160 is implemented using the controller 124, beam splitter 130 and light director 140 as shown, or is implemented with independent alignment and application devices. For certain applications, the probe laser 160 and the heating laser 120 are implemented in a common arrangement or as a single laser device.

While the optical cavity-emitter arrangement 110 is shown at a relatively large scale with several hole regions and optical cavities by way of illustration, a multitude of such holes and cavities are implemented with various example embodiments. Moreover, certain applications are directed to the integration of heating structures with the cavities, such as that shown in FIG. 2A and described below, with each cavity optionally suspended to mitigate heat conductivity from the cavity. In this regard, the optical cavity-emitter arrangement 110 is shown by way of example and may be implemented with one or more of a multitude of such arrangements, with the heating arrangement 105 as shown or with other heating arrangements that facilitate the selective heating of optical cavities.

The heating arrangement 105 can also be implemented using other approaches as alternatives to or in addition to the laser heating approach shown. For example, some embodiments are directed to the use of an electrical heater, coupled to pass electricity through a heating element located at respective optical cavities in the optical cavity arrangement 110. In this regard, a variety of heating approaches are used in connection with different example embodiments to suit the particular application and/or operate with available equipment.

As described above, a variety of emitters and optical cavities may be implemented in connection with the various example embodiments described herein. The following discussion, made in connection with other example embodiments and with FIG. 2A through FIG. 5, often refers to quantum dot emitters used with photonic crystal microcavities. However, these embodiments are amenable to implementation with other types of emitters and optical cavities, as well as other wavelength-dependent structures and are therefore not limited to the described emitters and optical cavities.

Figure 2A:
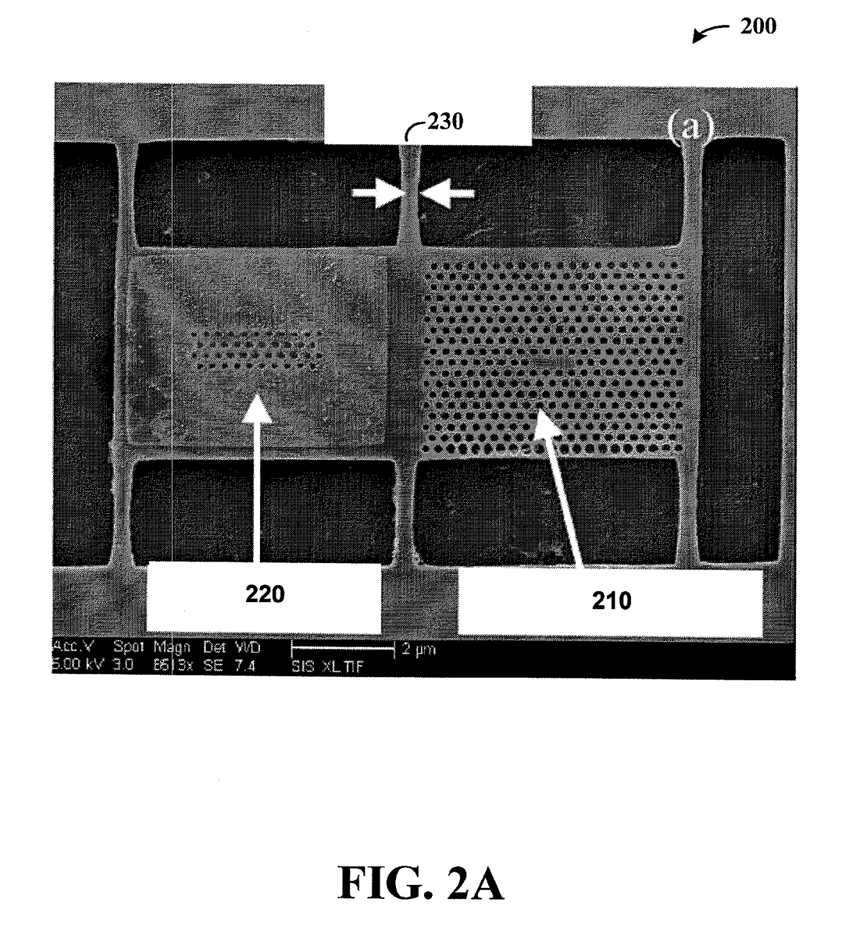
FIG. 2A shows a microcavity structure with heat-based spectral alignment, according to an example embodiment of the present invention.
Figure 2B:
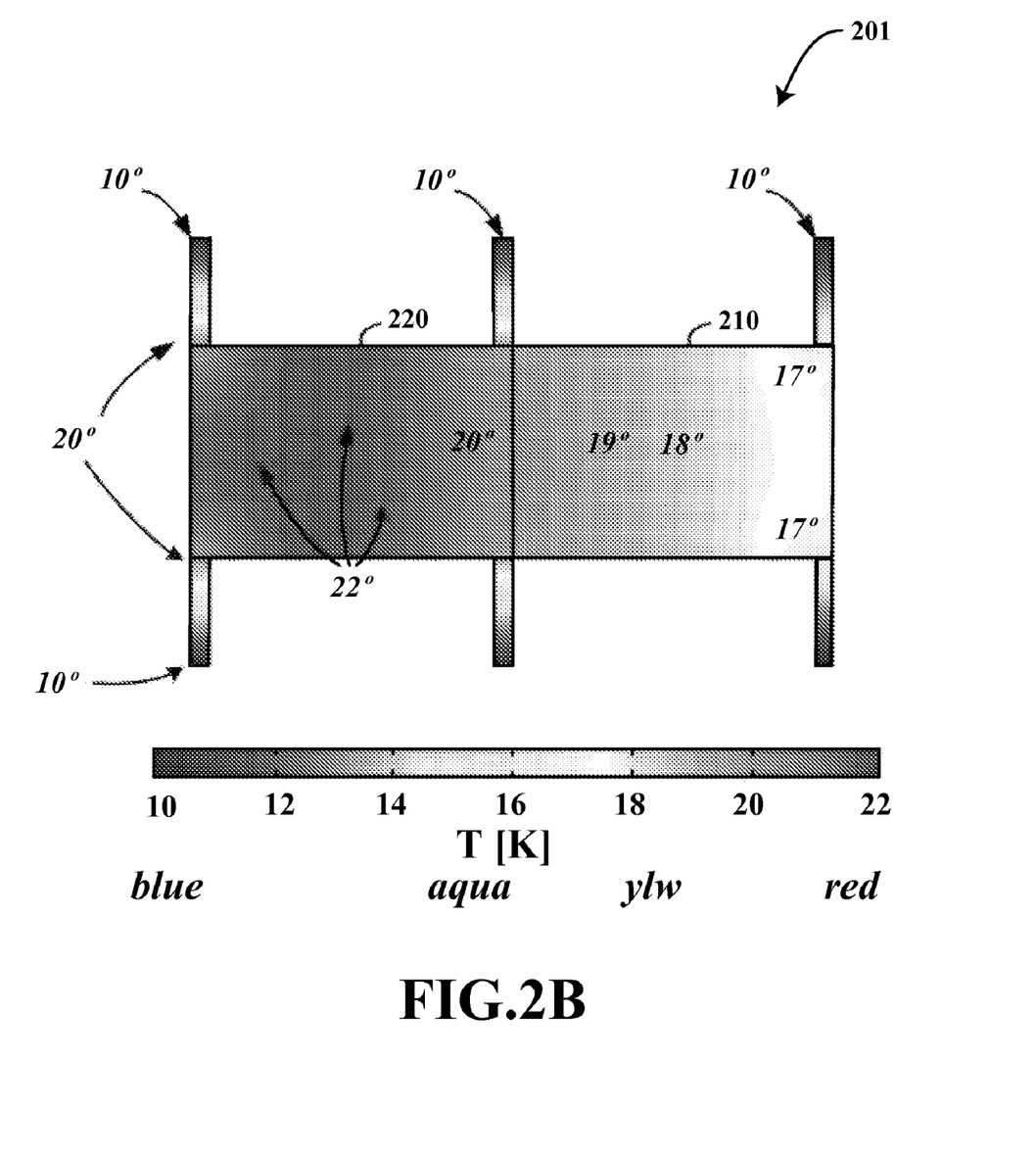
FIG. 2B shows heat distribution in the structure of FIG. 2A, in connection with another example embodiment of the present invention.

FIG. 2A shows a scanning electron microscope image of an optical device 200 employing heat-based spectral alignment, according to an example embodiment of the present invention. FIG. 2B is an image showing a temperature distribution of the device 200 as operated in connection with an example embodiment of the present invention, with a corresponding temperature scale at the lower portion of the figure and with exemplary (typed-over) temperatures.

Referring to FIG. 2A, the device 200 includes a photonic crystal cavity arrangement 210 and an adjacent heating structure 220, which are suspended via thin supports, or bridges, including support 230 that is labeled by way of example. The thin supports mitigate thermal conductivity between the shown device 200 and other devices (e.g., the rest of a photonic crystal chip). The temperature of the cavity arrangement 210 is controlled via the heating structure 220 by focusing a laser beam onto the heating structure 220 (or otherwise applying heat thereto). Where laser light is used and for some applications, the laser is tuned below the absorption frequency of the quantum dots to minimize background photoluminescence in single quantum dot measurements.

The following describes an approach in which to form the device 200, according to another example embodiment of the present invention. The suspended photonic crystal cavity arrangement 210 and heating structure 220 are fabricated on a quantum dot wafer grown by molecular beam epitaxy on a Si n-doped GaAs (100) substrate with a 0.1 μm buffer layer. To increase quantum dot collection efficiency, a ten-period distributed Bragg reflector (DBR) mirror is located underneath the quantum dots and including alternating layers of AlAs/GaAs (e.g., with respective thicknesses of about 80.2 nm and 67.6 nm). A 918 nm sacrificial layer of $Al_{0.8}Ga_{0.2}As$ is located above the DBR mirror. The active region (microcavity near the center of the membrane 210) includes a 150 nm thick GaAs region with a centered InGaAs/GaAs quantum dot layer (e.g., with the quantum dots self-assembled during epitaxy while operating in a Stranski-Krastanov growth mode). InGaAs islands are partially covered with GaAs and annealed before completely capping with GaAs. During the annealing step, Gallium diffuses into the InAs islands. This procedure blue shifts the emission wavelengths of the quantum dots towards the spectral region where Silicon-based detectors are more efficient. A metal layer (e.g., about 20 nm Chromium and about 15 nm Gold) is deposited on the heating structure 220 to increase heat absorption.

While FIG. 2A shows an individual photonic crystal cavity, the device 200 may be integrated on a photonic crystal circuit as alluded to above, with a multitude of such devices arranged in one or more of a variety of manners. In some applications, each device in such a circuit includes a local heater that facilitates the independent tuning of different components of the same circuit. Other modifications include the addition of electrical wires to the heating structure 220 to facilitate electrical heating as an alternative to, or in addition to, laser heating.

FIGS. 3A-3D show plots for approaches to emitter tuning in connection with various example embodiments. These plots may be implemented using, for example, devices such as those shown in FIG. 1 and FIG. 2A. Beginning with FIG. 3A, quantum dot emission wavelength for a structure such as that shown in FIG. 2A is plotted along the horizontal axis against heating pump power on the vertical axis. The quantum dot emission shifts by 1.4 nm (red-shifts) while increasing the heating laser power to 3 mW, with the line width broadening from 0.04 nm to 0.08 nm.

Figure 3A:
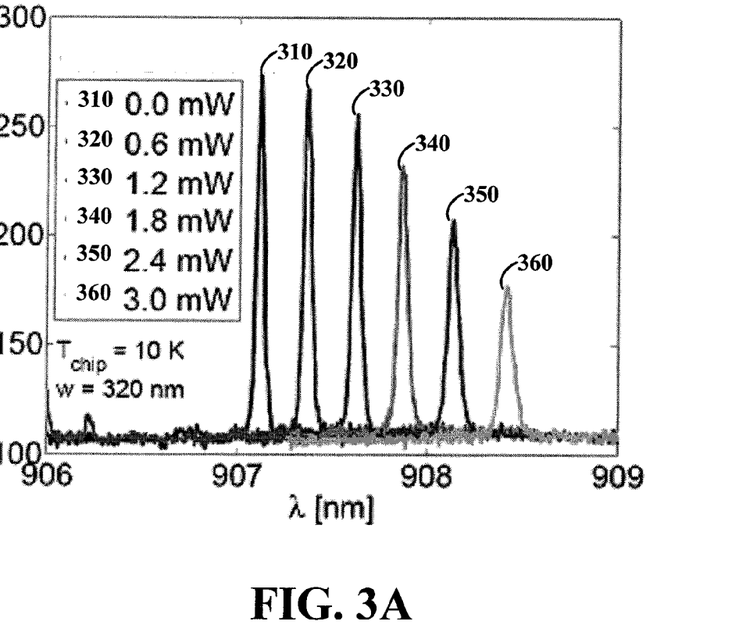
FIG. 3A shows quantum dot tuning vs. heating pump power.
Figure 3B:
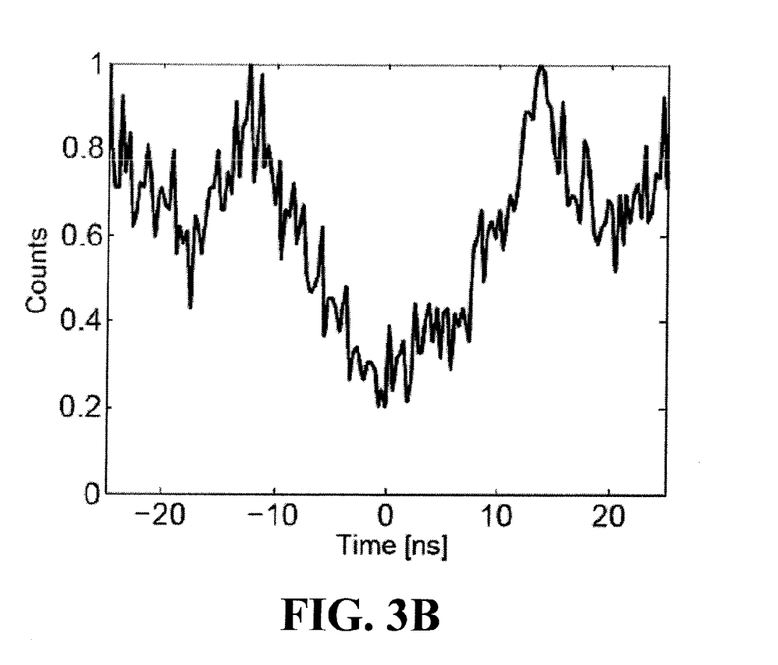
FIG. 3B shows single photon anti bunching during quantum dot detuning.

FIG. 3B shows a plot of time versus counts for single photon anti-bunching during quantum dot detuning (e.g., detuning by about 0.8 nm using a local tuning technique), in accordance with another embodiment. The single photon emissions are from an exciton transition and detected using, for example, a Hanbury Brown-Twiss interferometer while the emission line was shifted by about 0.8 nm.

Figure 3C:
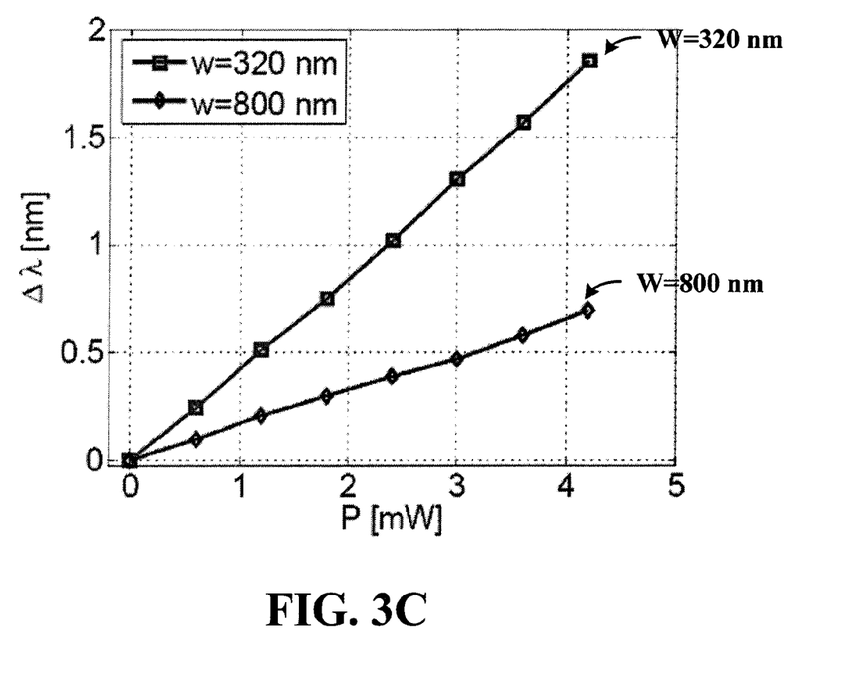
FIG. 3C shows quantum dot detuning versus heating laser power.

FIG. 3C shows heating laser power versus quantum dot detuning in accordance with another embodiment. The two shown data sets correspond to structures with different thermal contact to a surrounding substrate, respectively using 320 nm and 800 nm bridges such as the bridges shown in FIG. 2A, where the thermal conductance of the bridges is proportional to their width w. Under the same pump conditions, the temperature of the structure is generally inversely proportional to w.

Figure 3D:
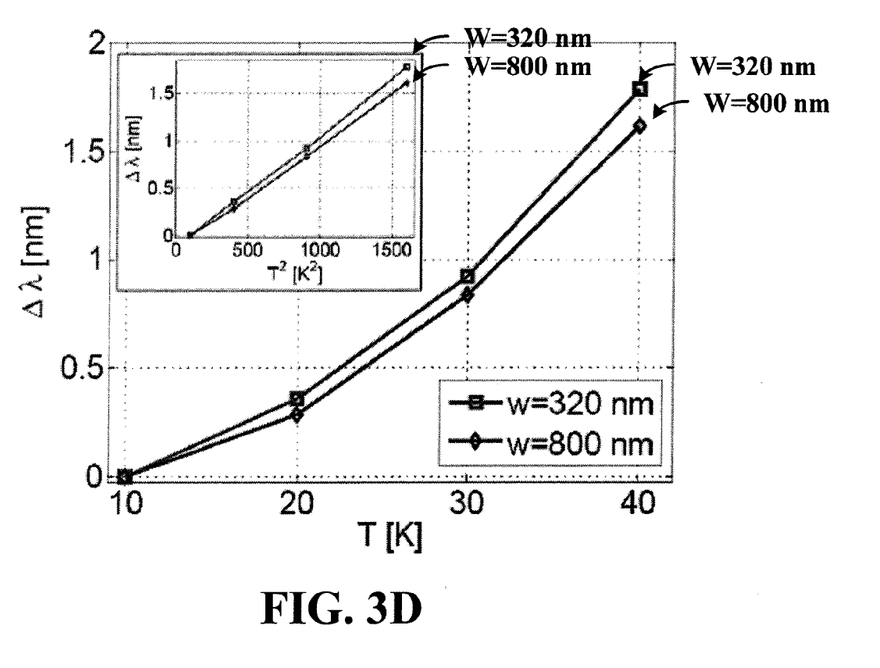
FIG. 3D shows quantum dot temperature tuning with temperature control of an entire chip via cryostat heating, with an inset showing linear detuning.

FIG. 3D shows quantum dot temperature tuning with temperature control of quantum dots, with an inset showing linear detuning, according to another example embodiment of the present invention. The results plotted in the inset of FIG. 3D show a quadratic dependence with temperature using a GaAs/InGaAs optical semiconductor device.

Figure 4A:
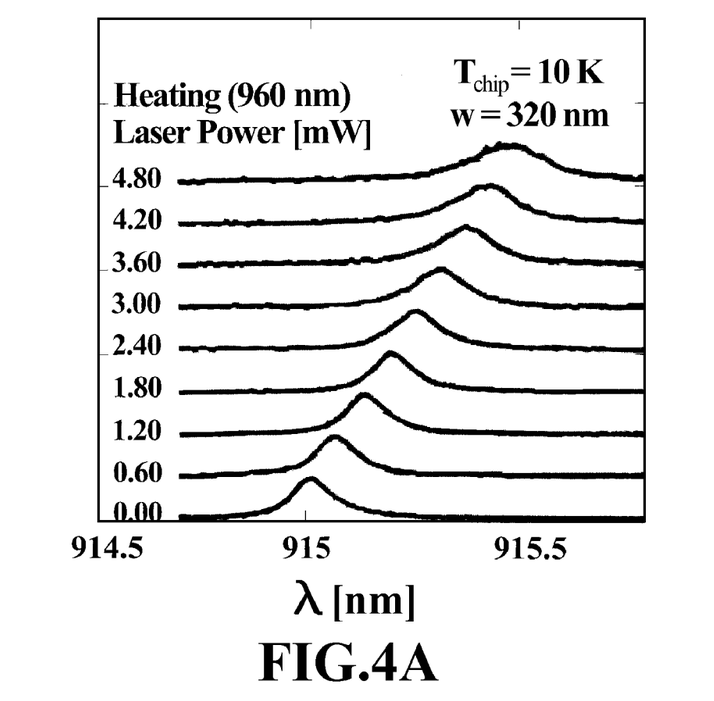
FIG. 4A shows the detuning of photonic crystal cavity resonance with increasing temperature due to local heating.
Figure 4B:
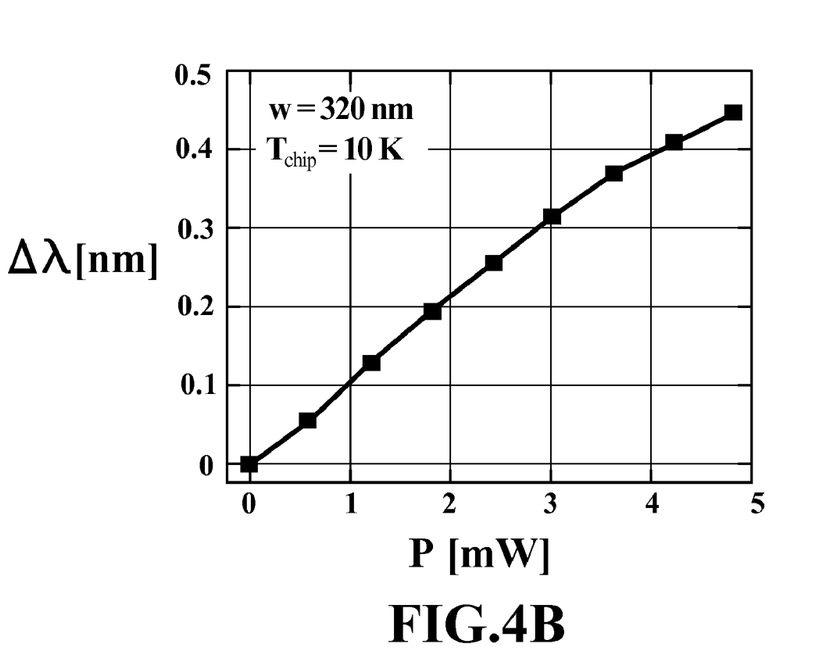
FIG. 4B shows the dependence of the photonic crystal cavity resonance wavelength on the local heating power.

FIGS. 4A-4B show plots characterizing the tuning of a photonic crystal cavity in connection with various example embodiments. Specifically, FIG. 4A shows the detuning of photonic cavity resonance with increasing temperature due to local heating, and FIG. 4B shows the dependence of the photonic crystal cavity resonance wavelength on the local heating power. The plots in FIG. 4A and FIG. 4B are implemented with a device such as that shown in FIG. 2A, with a local heating technique used to red shift a photonic crystal cavity resonance by up to about 0.48 nm, which is about 3 times less than a quantum dot shift as described above. The quality factor of the shifted cavity dropped from 7600 to 4900. Other approaches to tuning cavities that may be implemented with various embodiments include digital etching and the deposition of molecular layers on top of a photonic crystal membrane (or other optical semiconductor device).

Figure 5A:
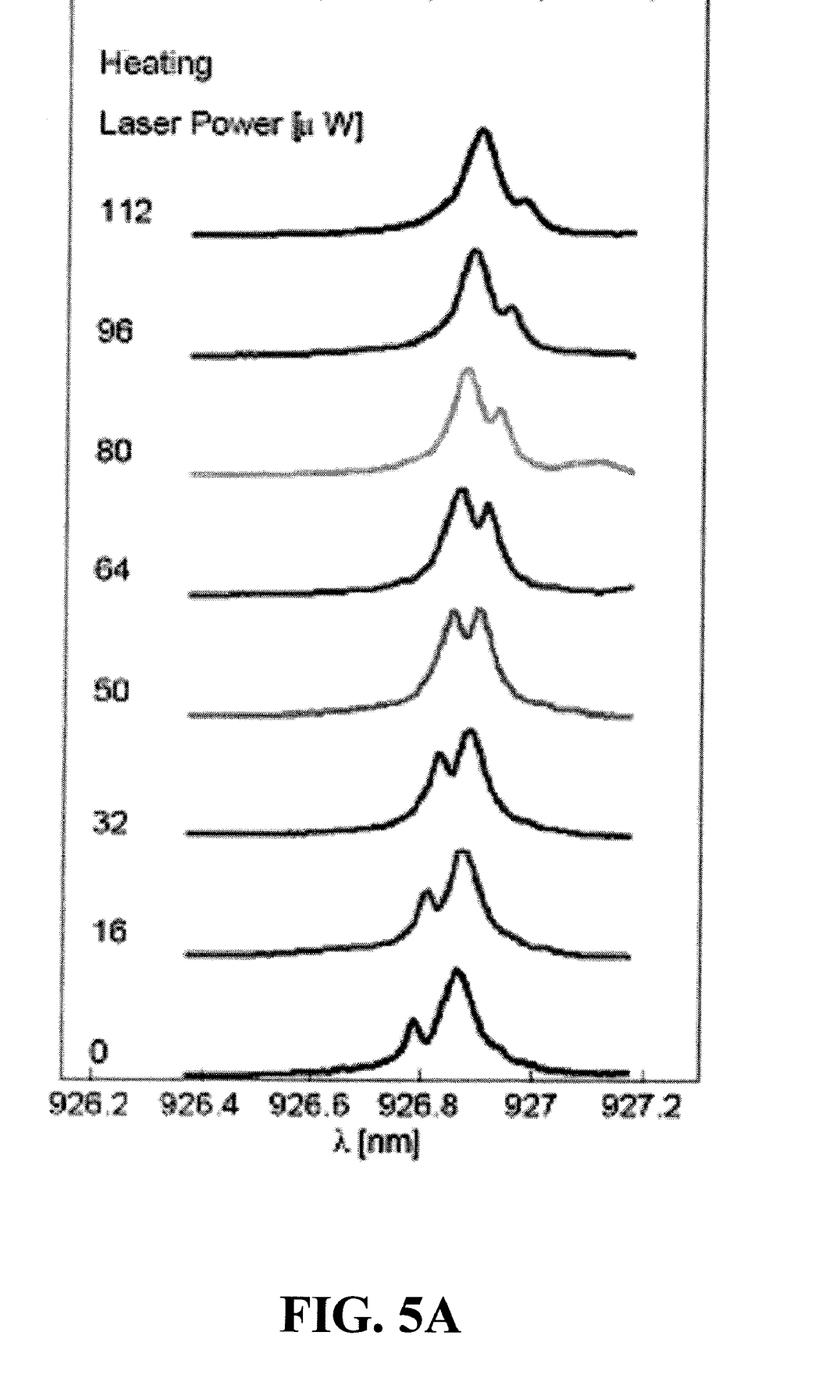
FIG. 5A shows plots of spectra showing the tuning of quantum dots into resonance with a cavity mode of a photonic crystal arrangement using a local heating technique, in accordance with various example embodiments of the present invention.

FIG. 5A shows spectra for various heating laser powers for an approach to tuning quantum dots into resonance with an optical cavity mode, according to another example embodiment of the present invention. A quantum dot is spectrally tuned onto the resonance of a photonic crystal cavity mode with a quality Q of about 10,000.

Figure 5B:
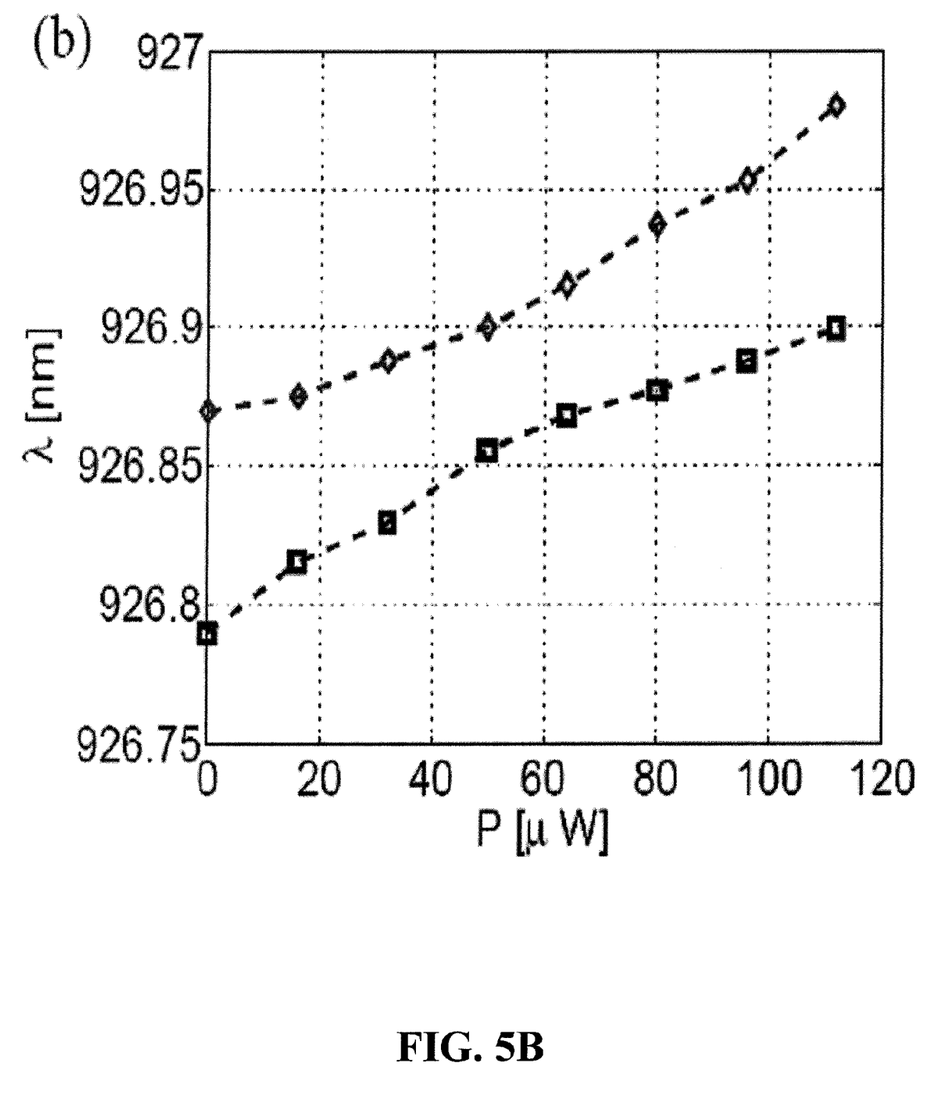
FIG. 5B shows splitting and anti-crossing of polariton states for a quantum dot tuned to an optical cavity, according to another example embodiment of the present invention.

FIG. 5B shows splitting (of about 0.05 nm) and anti-crossing of polariton states P for a quantum dot tuned to an optical cavity, which demonstrates a strong coupling regime. This approach is applicable, for example, to the tuning of quantum dots into resonance with an optical cavity as shown, for example, with FIG. 5A.

Various other example embodiments, as applicable with the above or otherwise, are described in the document entitled "Local Quantum Dot Tuning on Photonic Crystal Chips" and attached here as Appendix A, which forms part of this patent document.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, a variety of optical semiconductor materials, cavity types, wavelength-dependent devices and alignment devices are used in place of and/or in addition to those shown. Furthermore, those applications directed to photonic crystal cavities are selectively implemented with micro- and nanocavities. Similarly, applications discussed in connection with quantum dots may be selectively implemented with one or more of a variety of other emitters such as nanocrystal emitters. These approaches are implemented in connection with various example embodiments of the present invention. Such modifications and changes do not depart from the true scope of the present invention, including that set forth in the following claims.

What is claimed is:

1. A method for coupling light within an optical device having wavelength-dependent structures and optical cavities for optically coupling to the wavelength-dependent structures, the method comprising spectrally aligning one of the optical cavities and a wavelength-dependent structure independent of another of the optical cavities.

2. The method of claim 1, wherein spectrally aligning includes selectively applying heat to the device to spectrally align the operating wavelengths of the cavity and the wavelength-dependent structure.

3. The method of claim 1, wherein spectrally aligning includes selectively applying local strain to the device to spectrally align the operating wavelengths of the cavity and the wavelength-dependent structure.

4. The method of claim 1, wherein spectrally aligning includes shifting the operating wavelength of the cavity to spectrally align the operating wavelength of the cavity with an operating wavelength of the wavelength-dependent structure.

5. The method of claim 1, wherein spectrally aligning includes shifting the operating wavelength of the wavelength-dependent structure to spectrally align the operating wavelength of the wavelength-dependent structure with the operating wavelength of the cavity.

6. The method of claim 1, wherein spectrally aligning includes shifting the operating wavelength of both the cavity and the wavelength-dependent structure to spectrally align the operating wavelengths of the cavity and the wavelength-dependent structure.

7. The method of claim 1, further including,
after the step of spectrally aligning, de-aligning the spectrally aligned cavity and wavelength-dependent structure, and
after the step of de-aligning, spectrally aligning one of the optical cavities and a wavelength-dependent structure independent of another of the optical cavities.

8. The method of claim 1, wherein spectrally aligning includes spectrally aligning a single optical cavity region with a wavelength-dependent structure, independently from the spectral alignment of other cavity regions with other wavelength-dependent structures in the device.

9. The method of claim 1, wherein spectrally aligning one of the optical cavities and a wavelength-dependent structure independent of another of the optical cavities includes independently spectrally aligning at least two optical cavities in the structure respectively with at least two wavelength-dependent structures.

10. The method of claim 1, further including
detecting a change in frequency of the resonance of an optical cavity, and
using the detected change in frequency to determine an operating characteristic of the device.

11. The method of claim 1, wherein spectrally aligning includes applying a stimulus selected from the group of: an electrical stimulus, an optical stimulus, a heat stimulus and a physical strain stimulus.

12. The method of claim 1, further including
detecting a change in frequency of the resonance of a spectrally-aligned one of the optical cavities, and
using the detected change in frequency to determine a change in the refractive index of the device.

13. The method of claim 1, wherein the wavelength-dependent structure is an emitter and wherein spectrally aligning includes shifting the emission wavelength of the emitter, further including
    directing laser light to the one of the optical cavities, the laser light being tuned into resonance with the cavity,
    applying an oscillatory heating signal to the cavity,
    detecting laser light that is reflected from the cavity, and
    using the detected reflected laser light to characterize an interaction between the emitter and an optical field of the cavity.

14. The method of claim 1, wherein the device has an array of optical cavity regions, each region including one of the optical cavities and one of the wavelength-dependent structures, wherein spectrally aligning includes individually spectrally aligning the optical cavity and the wavelength-dependent structure in each of a plurality of the optical cavity regions.

15. An optical semiconductor device comprising:
    wavelength-dependent structures;
    optical semiconductor cavities for optically coupling to the wavelength-dependent structures; and
    a spectral alignment arrangement for spectrally aligning one of the optical cavities and a wavelength-dependent structure independent of another of the optical cavities.

16. The device of claim 15, wherein the spectral alignment arrangement selectively applies heat to the device to spectrally align operating wavelengths of the cavity and the wavelength-dependent structure.

17. The device of claim 15, wherein the spectral alignment arrangement selectively applies strain to the device to spectrally align operating wavelengths of the cavity and the wavelength-dependent structure.

18. The device of claim 15, wherein the spectral alignment arrangement selectively shifts an operating wavelength of the cavity to spectrally align the operating wavelength of the cavity with an operating wavelength of the wavelength-dependent structure.

19. The device of claim 15, wherein the spectral alignment arrangement selectively shifts an operating wavelength of the wavelength-dependent structure to spectrally align the operating wavelength of the wavelength-dependent structure with an operating wavelength of the cavity.

20. The device of claim 15, wherein the spectral alignment arrangement selectively shifts an operating wavelength of both the cavity and the wavelength-dependent structure to spectrally align the operating wavelengths of the cavity and the wavelength-dependent structure.

21. The device of claim 15, further including, for each cavity, a heating pad to facilitate the application of heat to facilitate said spectrally aligning.

22. The device of claim 15, further including, for each cavity, a heating pad to facilitate the application of heat to facilitate said spectrally aligning in response to laser light.

23. The device of claim 15, further including, for each cavity, a heating pad to facilitate the application of heat to facilitate said spectrally aligning in response to an electrical current across the heating pad.

24. The device of claim 15, further including thermal insulation to thermally insulate the cavities from one another.

25. The device of claim 15, wherein the spectral alignment arrangement is adapted to spectrally align a single optical cavity and wavelength-dependent structure in the device, independent from all of the other optical cavities in the device.

26. The device of claim 15, wherein the spectral alignment arrangement is adapted to spectrally align and de-align said one of the optical cavities and a wavelength-dependent structure independent of another of the optical cavities.

27. The device of claim 15, further including an optical detector to detect a light from the spectrally aligned optical cavity.

28. The device of claim 15, further including an optical detector to detect a light from the spectrally aligned optical cavity, the optical detector being adapted to detect light having a particular wavelength, wherein the spectral alignment arrangement spectrally aligns said one of the optical cavities and a wavelength-dependent structure to operate at the particular wavelength that the optical detector is adapted to detect.

29. The device of claim 15, further including fabricated pads adjacent to the optical semiconductor cavities to apply control stimulus to the cavities.

30. An optical quantum information processing arrangement with reconfigurable integrated optical circuits, the arrangement comprising:
    a plurality of optical circuits, each circuit including an emitter and an optical cavity that selectively passes light as a function of the wavelength of the light;
    a spectral alignment arrangement to spectrally align individual ones of the optical circuits, independently from the spectral alignment of other ones of the optical circuits by, for each of the optical circuits, temporarily shifting at least one of
        the wavelength at which the cavity passes light, and
        the wavelength at which the emitter emits light; and
    a detector to detect light from the temporarily spectrally-aligned optical circuits and to output a signal characterizing the detected light to facilitate at least one of quantum or optical information processing.

31. The arrangement of claim 30, wherein the optical circuits include reconfigurable photonic integrated circuits for at least one of optical communications or optical interconnect applications.

* * * * *